(12) United States Patent
Shiota

(10) Patent No.: US 10,968,063 B2
(45) Date of Patent: Apr. 6, 2021

(54) MEDIUM FEEDING DEVICE AND IMAGE READING APPARATUS

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/280,198

(22) Filed: Feb. 20, 2019

(65) Prior Publication Data

US 2019/0256309 A1 Aug. 22, 2019

(30) Foreign Application Priority Data

Feb. 20, 2018 (JP) .............................. JP2018-027901

(51) Int. Cl.
*B65H 7/12* (2006.01)
*B65H 7/06* (2006.01)
*B65H 1/04* (2006.01)
*B65H 5/06* (2006.01)
(Continued)

(52) U.S. Cl.
CPC ............... *B65H 7/06* (2013.01); *B65H 5/062* (2013.01); *B65H 5/36* (2013.01); *B65H 7/125* (2013.01); *H04N 1/0079* (2013.01); *H04N 1/00761* (2013.01); *H04N 1/00769* (2013.01); *H04N 1/00779* (2013.01); *B65H 2511/12* (2013.01); *B65H 2511/528* (2013.01); *B65H 2515/82* (2013.01); *B65H 2553/30* (2013.01); *B65H 2801/06* (2013.01); *B65H 2801/39* (2013.01);
(Continued)

(58) Field of Classification Search
CPC . B65H 7/06; B65H 7/12; B65H 7/125; B65H 7/18; B65H 7/20; B65H 2511/12; B65H 2511/10; B65H 2515/82; B65H 2601/521; B65H 2553/30; H04N 1/00769; H04N 1/00779; H04N 1/0079; G03G 15/703; G03G 2215/00341
See application file for complete search history.

(56) References Cited

U.S. PATENT DOCUMENTS

2006/0159471 A1 7/2006 Yasukawa et al.
2012/0235929 A1 9/2012 Hongo et al.
2014/0054850 A1 2/2014 Umi et al.
(Continued)

FOREIGN PATENT DOCUMENTS

JP 57-169767 A 10/1982
JP 2006-193286 A 7/2006
(Continued)

*Primary Examiner* — Luis A Gonzalez
(74) *Attorney, Agent, or Firm* — Workman Nydegger

(57) ABSTRACT

A medium feeding device includes: a placement unit on which a medium is placed; a pair of edge guides that is provided at the placement unit such that the edge guides are movable in a medium width direction to guide edges of the medium in the medium width direction that is a direction intersecting a medium feeding direction; feeding rollers that feed the medium placed on the placement unit; a path state detection section that detects a detection value in accordance with a state of the medium feeding path; a guide position detection section that detects positions of the edge guides; and a control section that determines whether or not the detection value detected by the path state detection section has exceeded a threshold value.

18 Claims, 11 Drawing Sheets

(51) Int. Cl.
*B65H 5/36* (2006.01)
*H04N 1/00* (2006.01)
(52) U.S. Cl.
CPC ..... *H04N 1/00681* (2013.01); *H04N 1/00771* (2013.01); *H04N 1/00774* (2013.01)

(56) References Cited

U.S. PATENT DOCUMENTS

2016/0059593 A1* 3/2016 Otsuka .................. B65H 1/266
347/16
2017/0275112 A1* 9/2017 Saito ........................ B65H 7/02

FOREIGN PATENT DOCUMENTS

| JP | 2012-193040 A | | 10/2012 |
| JP | 2014-043300 A | | 3/2014 |
| JP | 2017-039589 A | | 2/2017 |
| JP | 2017088269 A | * | 5/2017 |

* cited by examiner

MEDIUM FEEDING DEVICE AND IMAGE READING APPARATUS

BACKGROUND

1. Technical Field

The present invention relates to a medium feeding device that transports a medium and an image reading apparatus provided with the same.

2. Related Art

Hereinafter, a scanner that is an example of an image reading apparatus will be exemplified and described. Some scanner includes a feeding device that automatically feeds original documents (also referred to as an auto document feeder (ADF)) and is configured to be able to perform automatic feeding and reading of a plurality of original documents.

Here, unexpected abnormality may occur during transport of the original documents in an original document transport path inside an image reading apparatus due to binding of the original document, wrinkles, scratches, attached objects, or the like, this may adversely affect read images, and in the worst case, this may damage the original documents or the device. The abnormality in transporting original documents includes overlaid feeding, skewing, and jam, for example.

As such a method of detecting abnormality in transporting original document in the related art, there is a method in which a detection section that obtains a detection value that changes in accordance with a change in a state in transporting original documents is used to determine whether or not the detection value exceeds a threshold value and it determines that abnormality has occurred in a case in which the detection value has exceeded the threshold value.

For example, a technology that uses transmittance of ultrasonic waves as a detection value for detecting overlaid feeding, that uses a difference in passing timings of left and right leading ends of original documents as a detection value for detecting skewing, and that uses sound as a detection value for detecting jam has been used in the related art.

As an example of such technologies, JP-A-2012-193040 discloses a method in which sound generated in an original document transport path is detected by a microphone and jam of original documents is detected on the basis of a reference value regarding sound intensity and a reference value regarding sound continuation time.

JP-A-2017-039589 discloses a technology in which it is determined whether or not two or more overlaid papers are being fed on the basis of a received signal obtained from an ultrasonic receiving section and a threshold value.

The method in which jam is detected on the basis of sound generated in the original document transport path will be described as an example. Since it is determined whether or not jam has occurred depending on whether or not detected sound exceeds a prescribed reference value (threshold value), it is significantly important how to set the threshold value. Here, since a rate of occurrence of jam depends on feeding conditions and how a user uses the device, it is preferable to change the threshold value depending on the feeding conditions and how the user uses the device. However, giving responsibilities of changing such setting to the user may degrade usability of the device.

SUMMARY

An advantage of some aspects of the invention is to provide a device achieved in consideration of both usability of the device and more appropriate abnormality determination.

According to an aspect of the invention, there is provided a medium feeding device including: a placement unit on which a medium to be fed is placed; a pair of edge guides that is provided at the placement unit such that the edge guides are movable in a medium width direction to guide edges of the medium in the medium width direction that is a direction intersecting a medium feeding direction; feeding rollers that feed the medium placed on the placement unit; a medium feeding path through which the medium fed from the placement unit is fed; a path state detection section that obtains a detection value that changes in accordance with a change in a state of the medium feeding path; a guide position detection section that detects positions of the edge guides; and a control section that determines whether or not abnormality has occurred in the medium feeding path by comparing the detection value obtained from the path state detection section with a threshold value of the detection value, and the control section changes the threshold value in accordance with positions of the edge guides.

Rates of occurrence of jam of the medium tend to differ depending on positions of the pair of edge guides that guides the edges of the medium. For example, it is possible to state that skewing and jam of the medium tend to occur if the edge guides are not located at positions at which the edge guides are to guide the edges of the medium.

In this case, since the control section of the medium transport device changes the threshold value in accordance with the positions of the edge guides, it is possible to achieve the device in consideration of both usability of the device and more appropriate abnormality determination.

In the device, the control section may be able to detect relative positions of the pair of edge guides and the feeding rollers in the medium width direction on the basis of a detection signal of the guide position detection section, and the control section may set the threshold value that is applied in a case in which the feeding rollers are not located at the center of the pair of edge guides in the medium width direction to be smaller than the threshold value applied in a case in which the feeding rollers are located at the center of the pair of edge guides on the basis of the detection signal of the guide position detection section.

Skewing and jam of the medium tend to occur in a case in which the feeding rollers are not located at the center of the pair of edge guides in the medium width direction. In this case, since the control section sets the threshold value that is applied in a case in which the feeding rollers are not located at the center of the pair of edge guides in the medium width direction to be smaller than the threshold value that is applied in a case in which the feeding rollers are located at the center of the pair of edge guides, that is, the control section increases abnormality detection sensitivity, it is possible to more appropriately perform abnormality determination.

In the device, the pair of edge guides may be able to be displaced from maximum guide positions when both edges of a medium with the largest size in the medium width direction from among media with feedable sizes are guided to extended positions that are positions at which an interval between the edge guides are further extended, and the control section may set the threshold value that is applied in a case in which the pair of edge guides is at the extended position or on the further extended position side than the maximum guide positions to be smaller than the threshold value that is applied in a case in which the pair of edge guides is located at the maximum guide positions or further inward than the maximum guide positions on the basis of the detection signal of the guide position detection section.

The pair of edge guides being located further outward than the maximum guide positions (the extended position side) means that the medium is fed with the edges thereof not guided. In this case, since the control section sets the threshold value that is applied in a case in which the pair of edge guides is located at the extended positions or on the further extended position side than the maximum guide positions to be smaller than the threshold value that is applied in a case in which the pair of edge guides is located at the maximum guide positions or further inward than the maximum guide positions, that is, the control section increases abnormality detection sensitivity, on the basis of the detection signal of the guide position detection section, it is possible to more appropriately perform abnormality determination.

Note that the pair of edge guides being located further inward than certain positions means that the pair of edge guides has moved in a direction in which the interval therebetween is narrowed while the pair of edge guides being located further outward than the certain positions means that the pair of edge guides has moved in a direction in which the interval therebetween is expanded. The same is true for the following description.

In the device, the control section may set a medium feeding speed of the feeding rollers in a case in which the pair of edge guides is located at the extended position or on a further extended position side than the maximum guide positions to be lower than a medium feeding speed of the feeding rollers in a case in which the pair of edge guides is located at the maximum guide positions or further inward than the maximum guide positions on the basis of the detection signal of the guide position detection section.

As described above, the pair of edge guides being further outward than the maximum guide positions (on the extended position side) means that the medium is fed with the edges thereof not guided. In this case, since the medium feeding speed of the feeding rollers in the case in which the pair of edge guides is located at the extended positions or on the further extended position side than the maximum guide positions is set to be lower than the medium feeding speed of the feeding rollers in the case in which the pair of edge guides is at the maximum guide positions or further inward than the maximum guide positions, it is possible to expect an effect of suppressing jam of the medium.

In the device, the maximum guide positions may be positions at which longer sides of an A4 size paper defined by ISO 216 or longer sides of a letter size paper defined by ANSI A are guided.

In this case, it is possible to obtain the aforementioned effects and advantages with the configuration in which the maximum guide positions are the positions at which the longer sides of the A4 size paper defined by ISO 216 or the longer sides of the letter size paper defined by ANSI A are guided.

In the device, the pair of edge guides may be able to be displaced to card compatible positions at which shorter sides or longer sides of a medium with a card size defined by ISO/IEC 7810 ID-1 are guided, and the control section may set the threshold value that is applied in a case in which the pair of edge guides is located at the card compatible positions to be larger than the threshold value that is applied in a case in which the pair of edge guides is located further outward than the card compatible positions or does not determine whether or not abnormality has occurred, on the basis of the detection signal of the guide position detection section.

In a case in which the medium is a thick card formed of plastic, for example, the detection value of the path state detection section tends to be greatly different from those of other media, and there is a concern that it is erroneously determined that jam has occurred when no jam has occurred. In this case, since the control section sets the threshold value that is applied in the case in which the pair of edge guides is located at the card compatible positions to be larger than the threshold value that is applied in the case in which the pair of edge guides is located further outward than the card compatible positions (that is, reduces detection sensitivity) or does not determine whether or not abnormality has occurred on the basis of the detection signal of the guide position detection section, it is possible to suppress or avoid the aforementioned concern of erroneous determination.

In the device, the pair of edge guides may include a first edge guide and a second edge guide, the path state detection section may include a first path state detection section that is provided on a side of the first edge guide in the medium width direction and a second path state detection section that is provided on a side of the second edge guide, and the control section may determine whether or not abnormality has occurred on the basis of a first detection value detected by the first path state detection section and a first threshold value that is the threshold value corresponding to the first detection value and determines whether or not abnormality has occurred on the basis of a second detection value detected by the second path state detection section and a second threshold value that is the threshold value corresponding to the second detection value, and the control section may set the first threshold value to be smaller than the second threshold value in a case in which the first edge guide is closer to the center position of the medium feeding path in the medium width direction than the second edge guide on the basis of the detection signal of the guide position detection section.

There may be a case in which the pair of edge guides is asymmetrically located relative to the center position of the medium feeding path in the medium width direction. In this case, the user tends to set the medium such that an edge of the medium conforms to an edge guide that is closer to the center position (this is assumed to be the first edge guide here). If skewing of the medium occurs in this case, the edge of the medium strongly collides against the edge guide that is closer to the center position (first edge guide). If this is reliably detected, it is possible to prevent jam caused by skewing of the medium or to suppress advancement of the jam.

In this case, since the control section sets first threshold value to be smaller than the second threshold value (that is, increases detection sensitivity) in a case in which the first edge guide is closer to the center position than the second edge guide on the basis of the detection signal of the guide position detection section, it is possible to detect that the edge of the medium has strongly collided against the first edge guide, and thus to prevent jam caused by skewing of the medium, or to suppress advancement of jam.

According to another aspect of the invention, there is provided a medium feeding device including: a placement unit on which a medium to be fed is placed; a pair of edge guides that is provided at the placement unit such that the edge guides are movable in a medium width direction to guide edges of the medium in the medium width direction that is a direction intersecting a medium feeding direction; feeding rollers that feed the medium placed on the placement unit; a medium feeding path through which the medium fed from the placement unit is fed; a path state detection section that obtains a detection value that changes in accordance with a change in a state of the medium feeding path; a guide position detection section that detects positions of the edge guides; and a control section that determines whether or not abnormality has occurred in the medium feeding path by comparing the detection value obtained from the path state detection section with a threshold value of the detection value, the control section may be able to detect relative positions of the pair of edge guides and the feeding rollers in the medium width direction on the basis of a detection signal of the guide position detection section, and the control section may set the threshold value that is applied in a case in which the feeding rollers are not located at the center of the pair of edge guides in the medium width direction to be smaller than the threshold value applied in a case in which the feeding rollers are located at the center of the pair of edge guides on the basis of the detection signal of the guide position detection section.

In a case in which the feeding rollers are not located at the center of the pair of edge guides in the medium width direction, skewing and jam of the medium tend to occur. In this case, since the control section sets the threshold value that is applied in the case in which the feeding rollers are not located at the center of the pair of edge guides in the medium width direction to be smaller than the threshold value that is applied in the case in which the feeding rollers are located at the center of the pair of edge guides, that is, the control section increases abnormality detection sensitivity, it is possible to more appropriately perform abnormality determination.

According to still another aspect of the invention, there is provided a medium feeding device including: a placement unit on which a medium to be fed is placed; feeding rollers that feed the medium placed on the placement unit; a medium feeding path through which the medium fed from the placement unit is fed; a path state detection section that obtains a detection value that changes in accordance with a change in a state in the medium feeding path; a placement detection section that detects whether or not there is a medium on the placement unit; and a control section that compares the detection value obtained from the path state detection section with a threshold value of the detection value and determines whether or not abnormality has occurred in the medium feeding path, the control section may have an ordinary mode in which a feeding job is ended in a case in which feeding of the last medium on the placement unit has been detected on the basis of a detection signal of the placement detection section and a stand-by feeding mode in which the feeding job is stopped once and waits for placement of a next medium on the placement unit in a case I which feeding of the last medium on the placement unit is detected on the basis of the detection signal of the placement detection means, and if the next medium is placed on the placement unit, the feeding job is restarted, and the control section sets the threshold value that is applied when the stand-by feeding mode is executed to be smaller than the threshold value that is applied when the ordinary mode is executed.

In the stand-by feeding mode in which the feeding job is stopped once and waits for placement of the next medium on the placement unit, and if the next medium is placed on the placement unit, the feeding job is restarted, feeding is performed without using the edge guides with the media with different sizes set or with the pair of edge guides located at the most extended positions in many cases. That is, conditions under which skewing tends to happen occur.

In this case, since the control section sets the threshold value that is applied when the stand-by feeding mode is executed to be smaller than the threshold value that is applied in the ordinary mode is executed (that is, increases detection sensitivity), it is possible to more appropriately perform abnormality determination.

In the device, the control section may issue an alert in a case in which current positions of the edge guides are different from positions of the edge guides at the time of previously executing feeding.

In this case, since the control section issues the alert in the case in which the current positions of the edge guides are different from the positions of the edge guides at the time of previously executing feeding, it is possible to prevent jam in advance by prompting the user to appropriately use the edge guides, for example.

In the device, the path state detection section may be a section that detects a change in sound in the medium feeding path, and the detection value is a value indicating a sound volume, and the control section may determine that jam has occurred as the abnormality in a case in which the detection value has exceeded the threshold value.

In this case, any of the aforementioned effects and advantages are obtained with the configuration in which the path state detection section is the section that detects a change in sound in the medium feeding path, the detection value is a value indicating a sound volume, and the control section determines that jam has occurred as the abnormality in the case in which the detection value has exceeded the threshold value.

According to yet another aspect of the invention, there is provided an image reading apparatus including: a reading section that reads a medium; and the aforementioned medium feeding device that transports the medium to the reading section.

In this case, it is possible to obtain the aforementioned effects and advantages in the image reading apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a medium feeding device and an image reading apparatus according to the invention will be described with reference to drawings. In the embodiment, a document scanner (hereinafter, simply referred to as a scanner 1A) capable of reading at least one of a front surface and a rear surface of an on original document (hereinafter, referred to as an original document P), which is an example of the medium, will be described as an example of the image reading apparatus.

Note that in the X-Y-Z coordinate systems illustrated in the respective drawings, the X direction corresponds to a device width direction and also an original document width direction that is a direction intersecting an original document feeding direction (transport direction). In addition, the Y direction corresponds to an original document feeding direction (transport direction). The Z direction is a direction intersecting the Y direction and indicates a direction that substantially perpendicularly intersects a surface of an original document transported. The +Y direction side is assumed to be a device front surface side while the −Y direction side is assumed to be a device rear surface side. Also, the left side is assumed to be a +X direction while the right side is assumed to be a −X direction when viewed from the device front surface side. In addition, the +Z direction is assumed to be a device upper side (including an upper portion, an upper surface, and the like) while the −Z direction is assumed to be a device lower side (including a lower portion, a lower surface, and the like). The direction in which the original document P is fed (+Y direction side) is assumed to be "downstream" while the opposite direction (−Y direction side) is assumed to be "upstream".

Outline of Scanner

Figure 1:
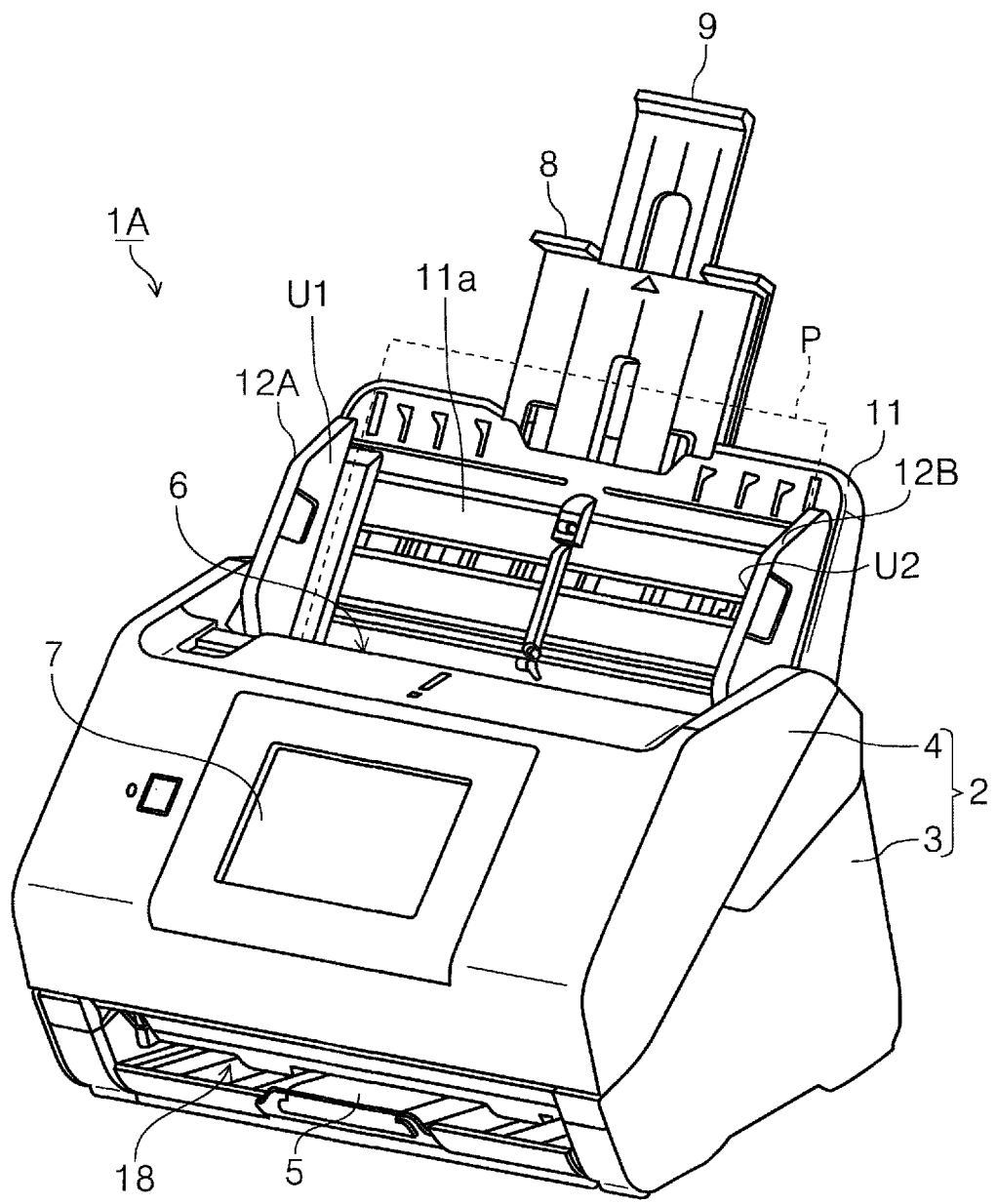
FIG. 1 is an exterior perspective view illustrating a scanner according to the invention.

Hereinafter, the scanner 1A that is the image reading apparatus according to the invention will be described mainly with reference to FIG. 1. FIG. 1 is an exterior perspective view illustrating the scanner 1A according to the embodiment.

The scanner 1A includes a device main body 2 that incorporates a reading unit 20 (FIG. 2) for reading an image on the original document P.

The device main body 2 includes a lower unit 3 and an upper unit 4. The upper unit 4 is provided such that the upper unit 4 can open and close by using a point on the downstream side in the original document transport direction with respect to the lower unit 3 by a turning support point, and it is possible to easily perform jam processing for the original document P by turning and opening the upper unit 4 on the device front surface side and exposing the original document transport path for the original document P.

On the device rear surface side of the device main body 2, an original document placement unit 11 that has a placement surface 11a on which the original document P fed is placed. The original document placement unit 11 is provided such that the original document placement unit 11 can be attached to and detached from the device main body 2.

In addition, a pair of edge guides, that is, a first edge guide 12A and a second edge guide 12B for guiding side edges in the width direction (X-axis direction) that intersects the feeding direction (Y-axis direction) of the original document P are provided at the original document placement unit 11. The first edge guide 12A and the second edge guide 12B include guide surfaces U1 and U2, respectively, for guiding the side edges of the original document P.

Note that the first edge guide 12A and the second edge guide 12B will be simply referred to as "edge guides 12" in the following description in a case in which it is not particularly necessary to distinguish the first edge guide 12A and the second edge guide 12B, or these two edge guides, namely the first edge guide 12A and the second edge guide 12B will be referred to as "a pair of edge guides 12" in some cases.

The original document placement unit 11 includes a first paper support 8 and a second paper support 9. The first paper support 8 and the second paper support 9 can be accommodated in the original document placement unit 11 and can be pulled out from the original document placement unit 11 as illustrated in FIG. 1, and the length of the placement surface 11a can be adjusted.

The device main body 2 includes an operation panel 7 that realizes a user interface (UI), through which various operations for reading setting and reading execution, which indicates content of reading setting and the like, on the device front surface side of the upper unit 4. The operation panel 7 is a so-called touch panel that can perform both display and input and serves both as an operation unit for performing various operations and as a display unit for displaying various kinds of information in the embodiment.

A feeding port 6 that continues to the inside of the device main body 2 is provided above the upper unit 4, and the original document P placed on the original document placement unit 11 is fed from the feeding port 6 to the reading unit 20 provided in the device main body 2.

Also, a paper discharge tray 5 for receiving discharged original document P is provided on the device front surface side of the lower unit 3.

Concerning Original Document Feeding (Transport) Path in Scanner

Figure 2:
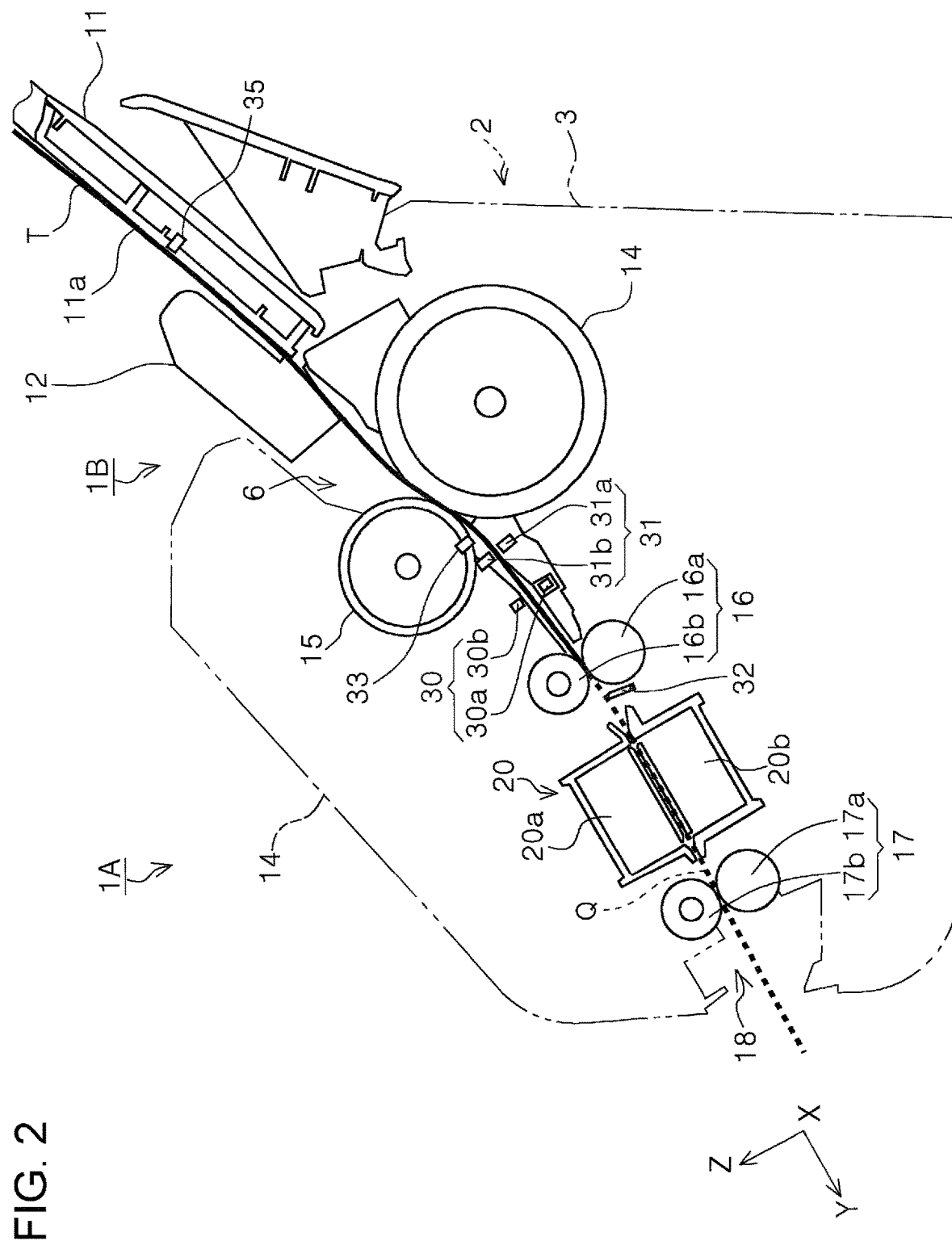
FIG. 2 is a side sectional view illustrating an original document feeding path in the scanner according to the invention.
Figure 3:
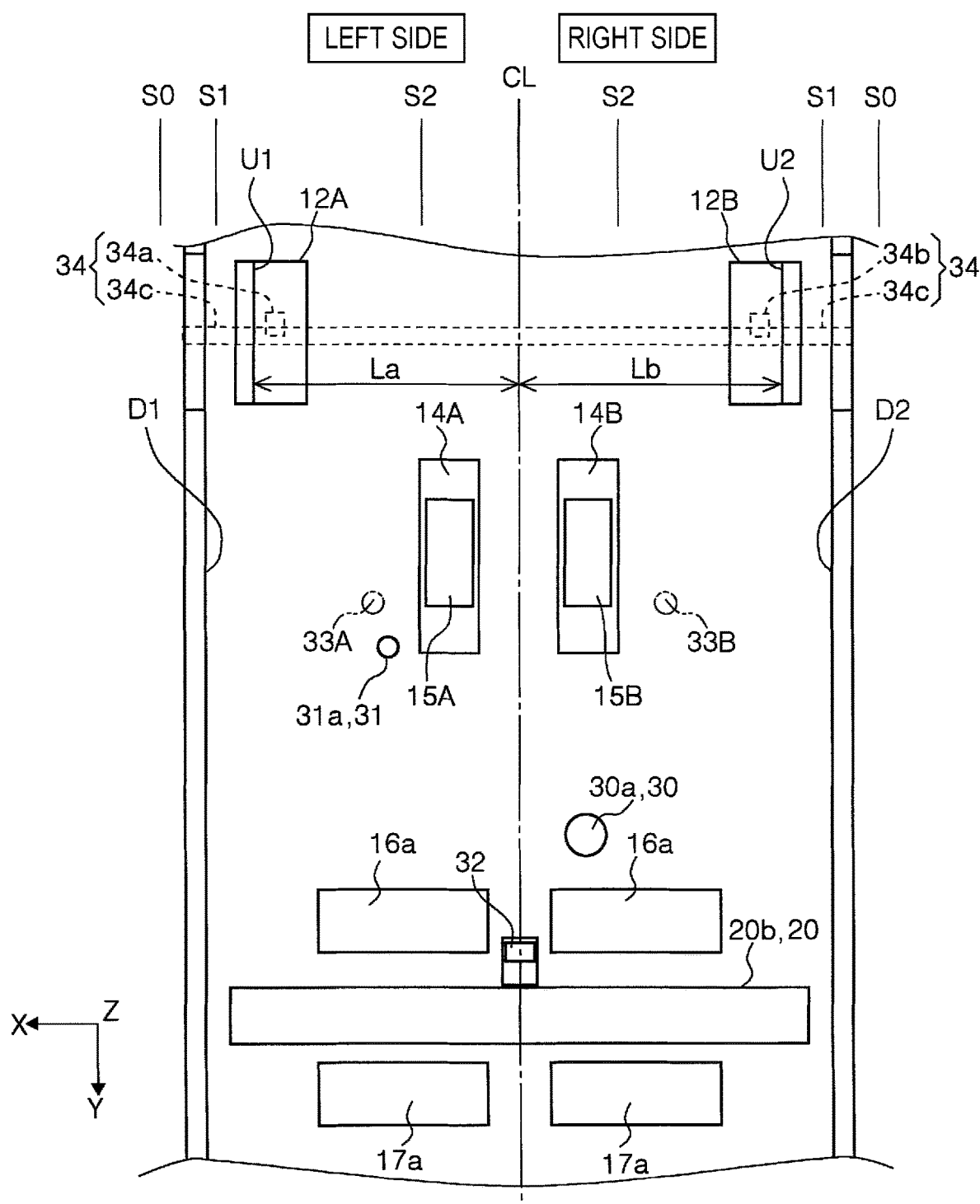
FIG. 3 is a plan view illustrating the original document feeding path in the scanner according to the invention.

Next, an original document feeding device 1B according to the invention, that is, the original document feeding path in the scanner 1A will be described with reference mainly to FIGS. 2 and 3. FIG. 2 is a side sectional view illustrating the original document feeding path in the scanner 1A according to the invention, and FIG. 3 is a plan view thereof.

The scanner 1A includes the original document feeding device 1B. The original document feeding device 1B generally includes components (the original document placement unit 11, the edge guides 12, the feeding rollers 14, the separation rollers 15, and the like) related to feeding of the original document in the scanner 1A. The original document feeding device 1B can also be understood as a device obtained by omitting a function (the reading unit 20, which will be described later) related to reading of the original document from the scanner 1A. Alternatively, the scanner 1A itself can also be understood as the original document feeding device when attention is paid to the point of feeding of the original document even if the function (the reading unit 20, which will be described later) related to reading of the original document is provided.

The solid line represented with the reference numeral T in FIG. 2 represents the original document feeding path (in other words, a track through which the original document P passes). The original document feeding path T has a space interposed between the lower unit 3 and the upper unit 4. Note that since the original document feeding path T can be defined as a path extending from the original document placement unit 11 to the transport roller pair 16, the path (original document transport path) of the original document on the further downstream side than the transport roller pair 16 is represented by a broken line in FIG. 2. The path represented by the broken line, that is, the original document path on the further downstream side than the transport roller pair 16 will be described as a downstream path Q in the following description.

The original document placement unit 11 is provided on the most upstream side of the original document feeding path T, and the feeding rollers 14 that feed the original document P placed on the placement surface 11a of the original document placement unit 11 toward the reading unit 20 and the separation rollers 15 that nip and separate the original document P with the feeding rollers 14 are provided on the downstream side of the original document placement unit 11. The first edge guide 12A and the second edge guide 12B are provided at the original document placement unit 11 as described above, and details thereof will be described again later.

The feeding rollers 14 are brought into contact with the lowermost original document P from among original documents P placed on the placement surface 11a of the original document placement unit 11. Therefore, in a case in which a plurality of original documents P are set on the original document placement unit 11 in the scanner 1A, the original documents P are fed toward the downstream side in an order from the original document P on the side of the placement surface 11a.

Note that the original document placement unit 11 is provided with a placement detection unit 35 that serves as a placement detection section for detecting whether or not original documents P are present on the original document placement unit 11.

Two feeding rollers 14 are arranged symmetrically with respect to a center position CL in the original document width direction as illustrated in FIG. 3 in the embodiment. The feeding roller 14 on the left side with respect to the center position CL is represented by the reference numeral 14A while the feeding roller on the right side with respect to the center position CL is represented by the reference numeral 14B in FIG. 3.

Similarly, two separation rollers 15 are arranged symmetrically with respect to the center position CL. The separation roller on the left side with respect to the center position CL is represented by the reference numeral 15A while the feeding roller on the right side with respect to the center position CL is represented by the reference numeral 15B.

In the following description, the feeding rollers 14A and 14B will be referred to as feeding rollers 14 in a case in which it is not particularly necessary to distinguish the feeding rollers 14A and 14B, and similarly, the separation rollers 15A and 15B will be referred to as feeding rollers 15 in a case in which it is not particularly necessary to distinguish the separation rollers 15A and 15B.

Figure 4:
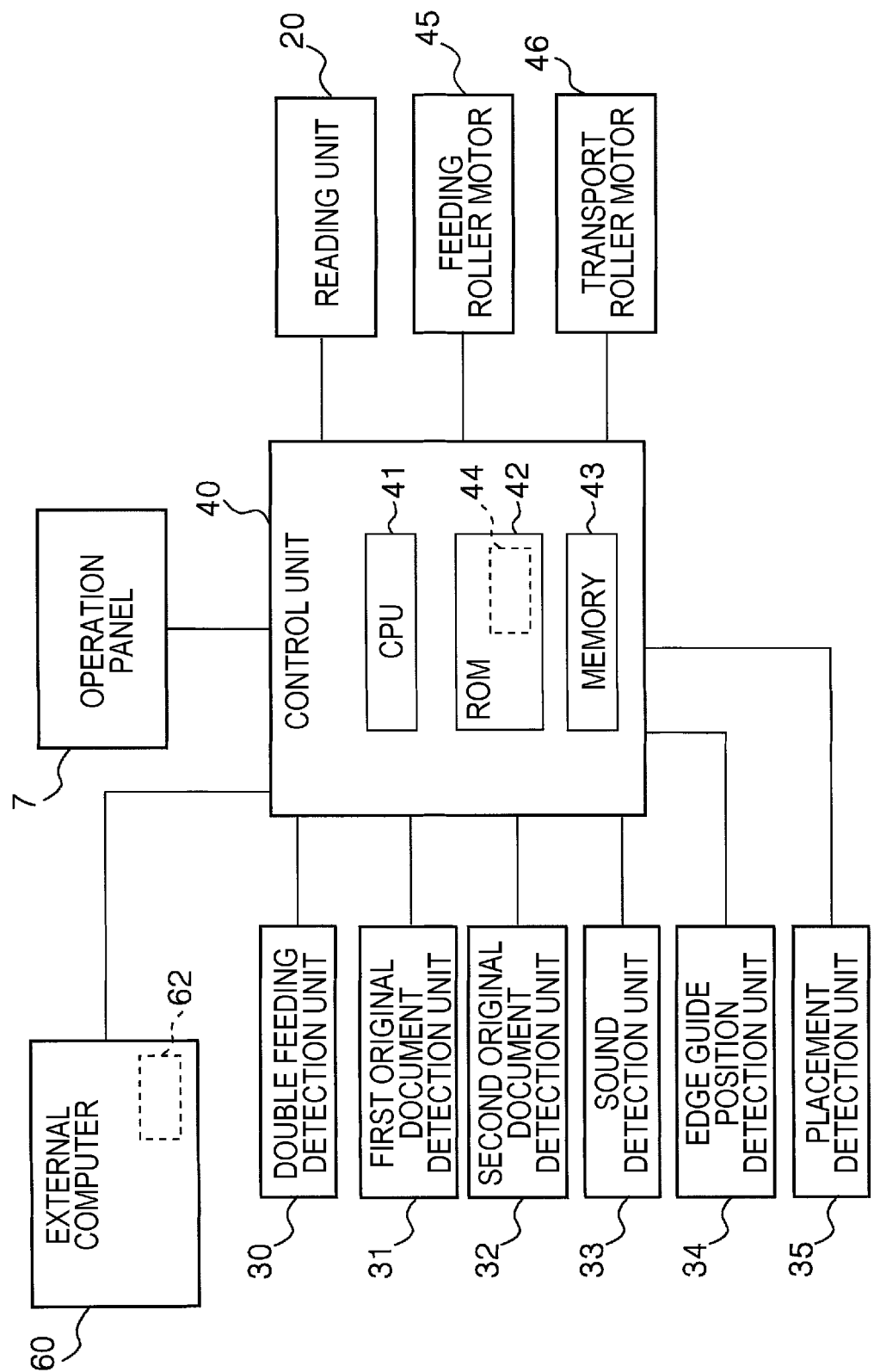
FIG. 4 is a block diagram illustrating a control system of the scanner according to the invention.

The feeding rollers 14 are driven to rotate by the feeding roller motor 45 (FIG. 4). The feeding rollers 14 obtain a rotation torque from the feeding roller motor 45 and rotate in the counterclockwise direction in FIG. 2.

A rotation torque is delivered from a transport roller motor 46 (FIG. 4) to the separation rollers 15 via a torque limiter, which is not illustrated in the drawing.

In a case in which no original document P is present between the feeding rollers 14 and the separation rollers 15, or in a case in which only one original document P is present therebetween, the separation rollers 15 is driven to rotate (in the clockwise direction in FIG. 2) regardless of the rotation torque received from the transport roller motor 46 by slipping occurs at the torque limiter, which is not illustrated in the drawing.

If the second and following original documents P have entered between the feeding rollers 14 and the separation rollers 15 in addition not the original document P to be fed, the separation rollers 15 rotate in the counterclockwise direction in FIG. 2 by the rotation torque received from the transport roller motor 46 due to slipping occurring between the original documents. In this manner, overlaid feeding of the original documents P is prevented.

On the downstream side of the feeding rollers 14, the transport roller pair 16, the reading unit 20 for reading an image, and a discharge roller pair 17 are provided. The transport roller pair 16 includes transport driving rollers 16a that are driven to rotate by the transport roller motor 46 (FIG. 4) and transport driven rollers 16b that are rotated in a driven manner. Two transport driving rollers 16a are arranged at positions that are symmetric with respect to the center position CL as illustrated in FIG. 3 in the embodiment. The same is true for the transport driven rollers 16b.

The original document P that has been nipped by the feeding rollers 14 and the separation rollers 15 and has been fed to the downstream side is then nipped by the transport roller pair 16 and is transported to the reading unit 20 located on the downstream side of the transport roller pair 16.

Note that sound detection units 33 that detect sound generated in the original document feeding path T and the downstream path Q are provided in the vicinity of the nipping position of the feeding rollers 14 and the separation rollers 15, more specifically, on a slightly downstream side of the nipping position as illustrated in FIG. 2. The sound detection units 33 are microphones, convert sound into an electrical signal, and transmit the electrical signal to a control unit 40 (FIG. 4) that serves as the control section. The sound detection units 33 are an example of the "path state detection section" that obtains detection value that changes in accordance with a change in a state in the original document feeding path T or the downstream path Q, detects sound in the original document feeding path T or the downstream path Q, and converts the sound into an electrical signal.

Two sound detection units 33 are arranged at positions that are symmetric with respect to the center position CL as illustrated in FIG. 3. The reference numeral 33A represents a first sound detection unit that serves as the "first path state detection section" arranged on the left side with respect to the center position CL while the reference numeral 33B represents a second sound detection unit that serves as the "second path state detection section" arranged on the right side with respect to the center position CL. Hereinafter, the first sound detection unit 33A and the second sound detection unit 33B will be simply referred to as sound detection units 33 in a case in which it is not particularly necessary to distinguish the first sound detection unit 33A and the second sound detection unit 33B.

The control unit 40 (FIG. 4) determines whether or not a detection value obtained by the sound detection unit 33 is equal to or greater than a threshold value, and if the detection value is equal to or greater than the threshold value, the control unit 40 determines that jam of the original document P, which is an example of abnormality in the original document feeding path T or the downstream path Q, has occurred and performs necessary processing (such as issuing of an alert). Note that the control unit 40 (FIG. 4) determines that jam has occurred if a detection value of either the first sound detection unit 33A or the second sound detection unit 33B is equal to or greater than the threshold value.

Note that although the following description will focus on occurrence of jam in the original document feeding path T, occurrence of jam in the downstream path Q is not excluded.

In addition, although a change in a state in the original document feeding path T is understood as jam of the original document P in one example in the embodiment, this is just an example, and it is possible to state that skewing or the like of the original document P, for example, is also included in the change in the state in the original document feeding path T. Although a sound volume is employed as the detection value that changes in accordance with such a change in a state, this is just an example, it is also possible to employ a drive current value of the feeding roller motor 45 (FIG. 4) or of the transport roller motor 46 (FIG. 4) as the detection value as long as the drive current value changes due to jam of the original document P, for example, and in this case, a motor control circuit serves as the path state detection section in one example. Alternatively, if oscillation occurs in the original document feeding path T due to jam of the original document P, this can be employed as the detection value, and in this case, an oscillation sensor serves as the path state detection section. In this manner, various changes in a state in the original document transport path T and various path state detection sections that obtain a detection value that changes in accordance with the change in the state can be considered.

Next, a first original document detection unit 31 is provided on the downstream side of the sound detection unit 33. The first original document detection unit 31 is formed as an optical sensor in one example and includes a light emitting unit 31a and a light receiving unit 31b that are arranged to face with the original document feeding path T interposed therebetween, and the light receiving unit 31b transmits an electrical signal indicating intensity of detected light to the control unit 40 (FIG. 4). The electrical signal indicating intensity of the detection light changes by the transported original document P blocking the detection light emitted from the light emitting unit 31a, and the control unit 40 (FIG. 4) can thus detect passage of the leading end or the rear end of the original document P.

In addition, the overlaid feeding detection unit 30 that detects overlaid feeding of original documents P is arranged on the downstream side of the first original document detection unit 31. The overlaid feeding detection unit 30 includes an ultrasonic wave emitting unit 30a and an ultrasonic wave receiving unit 30b for receiving ultrasonic waves that are arranged to face each other with the original document feeding path T interposed therebetween, and the ultrasonic wave receiving unit 30b transmits an electrical signal indicating the detected intensity of ultrasonic waves to the control unit 40 (FIG. 4). If overlaid feeding of the original documents P occurs, the electrical signal indicating the intensity of ultrasonic waves changes, and the control unit 40 (FIG. 4) can thus detect the overlaid feeding of the original documents P.

In addition, a second original document detection unit 32 is provided on the downstream side of the overlaid feeding detection unit 30. The second original document detection unit 32 is formed as a contact-type sensor that has a lever, and if the lever is turned with passage of the leading end or the rear end of the original document P, the electrical signal sent from the second original document detection unit 32 to the control unit 40 (FIG. 4), and the control unit 40 (FIG. 4) can thus detect passage of the leading end or the rear end of the original document P.

The control unit 40 (FIG. 4) can recognize the position of the original document P in the original document feeding path T by the aforementioned first original document detection unit 31 and the second original document detection unit 32.

Next, the reading unit 20 provided on the downstream side of the second original document detection unit 32 includes an upper reading sensor 20a provided on the side of the upper unit 4 and a lower reading sensor 20b provided on the side of the lower unit 3. In the embodiment, the upper reading sensor 20a and the lower reading sensor 20b are formed as contact image sensor module (CISM) in one example.

After an image on at least one side of the front surface and the rear surface of the original document P is read by the reading unit 20, the original document P is nipped by the discharge roller pair 17 located on the downstream side of the reading unit 20 and is then discharged from the discharge port 18 provided on the device front surface side of the lower unit 3.

The discharge roller pair 17 includes discharge driving rollers 17a that are driven to rotate by the transport roller motor 46 (FIG. 4) and discharge driven rollers 17b that are rotated in a driven manner. Two discharge driving rollers 17a are arranged at positions that are symmetric with respect to the center position CL in the embodiment as illustrated in FIG. 3. The same is true for the discharge driven rollers 17b.

Concerning Positions of Edge Guides

Next, positions of the edge guides 12 will be described with reference to FIG. 3. The first edge guide 12A and the second edge guide 12B are provided on the left side and the right side, respectively, with respect to the center position CL in the original document width direction. In the embodiment, the first edge guide 12A and the second edge guide 12B are provided such that the first edge guide 12A and the second edge guide 12B can be respectively independently displaced in the original document width direction and the displaced positions can be held by a holding section (for example, a frictional member or a meshing section of saw-like tooth), which is not illustrated in the drawing. Therefore, a distance La between the center position CL and a guide surface U1 of the first edge guide 12A is not necessarily the same as a distance Lb between the center position CL and a guide surface U2 of the second edge guide 12B. However, the first edge guide 12A and the second edge guide 12B may be formed such that the first edge guide 12A and the second edge guide 12B are displaced in a conjunction manner, that is, such that if one of the first edge guide 12A and the second edge guide 12B is operated, the other follows the one and is displaced, and the first edge guide 12A and the second edge guide 12B are constantly moved to positions that are symmetric with respect to the center position CL.

The reference numerals D1 and D2 in FIG. 3 respectively represent guide surfaces that form the furthest ends of the medium feeding path T in the medium width direction. In the embodiment, the distance from the center position CL to the guide surface D1 is the same as the distance from the center position CL to the guide surface D2.

The reference numerals S0, S1, and S2 represent possible positions of the guide surface U1 of the first edge guide 12A and the guide surface U2 of the second edge guide 12B, and S1 and S2 among them will be referred to as guide positions while S0 will be referred to as an extended position.

The guide position S1 is a position corresponding to a shorter side of a largest original document (for example, a letter size) that can be expected in terms of a design of the device, and more specifically, the guide position S1 is a position at which the longer side of a letter size original document is guided. Therefore, it is possible to regard the guide position S1 as a maximum guide position.

Also, the guide position S2 is a position corresponding to a shorter side of a smallest original document (for example, a card size) that can be expected in terms of a design of the device, and more specifically, the guide position S2 is a position at which the longer side of the original document with the card size is guided.

Note that the letter size described here is a letter size defined by ANSI (American National Standards Institute) A, and the length of the shorter side is 216 mm while the length of the longer side is 279 mm. Therefore, La+Lb=216 mm.

In addition, the card size described here is a card size defined by ISO/IEC (International Organization for Standardization/International Electrotechnical Commission) 7810 ID-1, and the length of the shorter side is 53.98 mm while the length of the longer side is 85.60 mm. Therefore, La+Lb=53.98 mm.

Note that the guide position S1 may be a position corresponding to the A4 size defined by ISO (International Organization for Standardization) 216, that is, a position at which the longer side of the A4 size original document is guided, instead of the position corresponding to the letter size. The length of the shorter side of the A4 size paper is 210 mm while the length of the longer side is 297 mm.

Note that the extended position S0 is a position further outward than the guide position S1 that is a position at which a side end of the largest original document (the letter size in the embodiment) that can be expected in terms of the design of the device, that is, at which the distances La and Lb become longer than those at the guide position S1. The guide surface U1 of the first edge guide 12A and the guide surface U2 of the second edge guide 12B can be displaced up to the extended position S0. However since the position is a position further outward than the guide surfaces D1 and D2 that are the furthest ends of the medium feeding path T in the medium width direction, it is possible to state that the position is not a position at which the side end of the original document P is guided.

Note that in the following description, the positions of the edge guides 12 may be expressed as "moving to the outer side" in a case in which the edge guides 12 moves in a direction away from the center position CL and may be expressed as "moving to the inner side" in a case in which the edge guides 12 moves in a direction in which the edge guides 12 approaches the center position CL. For example, the first edge guide 12A moving to the outer side means that the first edge guide 12A moves in a direction in which the distance La increases, and the first edge guide 12B moving to the inner side means that the first edge guide 12B moves in a direction in which the distance La decreases. The same is true for the second edge guide 12B.

Next, an edge guide position detection unit 34 that serves as the guide position detection section for detecting the current positions of the respective edge guides is provided on the rear surface side of the edge guides 12. The edge guide position detection unit 34 includes a linear scale 34c extending in a displacing direction of the edge guide 12, a sensor 34a provided at the first edge guide 12A, and a sensor 34b provided at the second edge guide 12B.

In the embodiment, the linear scale 34c is an absolute value linear scale with a configuration with which it is possible to recognize the current positions of the edge guides 12 without performing an operation of detecting an origin. The control unit 40 (FIG. 4), which will be described later, can recognize the current position of the first edge guide 12A on the basis of a detection signal of the sensor 34a and can recognize the current position of the second edge guide 12B on the basis of a detection signal of the sensor 34b. In this manner, the control unit 40 (FIG. 4) can also recognize relative positions of the first edge guide 12A and the second edge guide 12B with respect to the center position CL and can also recognize relative positions of the first edge guide 12A and the second edge guide 12B with respect to the feeding rollers 14A and 14B.

Concerning Control System in Scanner

Hereinafter, control systems in the scanner 1A and the medium feeding device 1B will be described with reference to FIG. 4. FIG. 4 is a block diagram illustrating the control system of the scanner 1A according to the invention.

In FIG. 4, the control unit 40 that serves as the control section performs various kinds of control, which includes control of feeding, transport, and discharge and control of reading of the original document P, for the scanner 1A and the medium feeding device 1B. A signal from the operation panel 7 is input to the control unit 40, ad a signal for displaying the operation panel 7, in particular, a signal for realizing a user interface (UI) is transmitted from the control unit 40 to the operation panel 7.

The control unit 40 controls the feeding roller motor 45 and the transport roller motor 46. As described above, the feeding roller motor 45 is a drive source of the feeding rollers 14 illustrated in FIG. 2, and the transport roller motor 46 is a drive source of the separation rollers 15, the transport roller pair 16, and the discharge roller pair 17 illustrated in FIG. 2.

Data read from the reading unit 20 is input to the control unit 40, and a signal for controlling the reading unit 20 is transmitted from the control unit 40 to the reading unit 20.

Signals from the detection sections including the overlaid feeding detection unit 30, the first original document detection unit 31, the second original document detection unit 32, the sound detection unit 33, the edge guide position detection unit 34, and the placement detection unit 35 are also input to the control unit 40.

The control unit 40 includes a CPU 41, a ROM 42, and a memory 43. The CPU 41 performs various kinds of arithmetic processing in accordance with a program 44 stored in the ROM 42 and controls overall operations of the scanner 1A. Note that the memory 43 that is an example of the storage unit is a readable and writable non-volatile memory and various kinds of data necessary to determine jam, which will be described later, and immediately previously detected position information of the edge guides 12 are stored therein. In the specification, it is assumed that all parameters necessary to determine jam, such as a detection value and a threshold value, which will be described later, parameters necessary to change feeding conditions, and the like are stored in the memory 43, and that the values are updated by the control unit 40 as needed unless otherwise not particularly described.

The program 44 stored in the ROM 42 does not necessarily mean a single program and includes a plurality of programs which include a program for determining jam in the original document feeding path T, a program for changing a threshold value, which will be described later, a program for controlling a UI to be displayed on the operation panel 7, and various control programs necessary to transport and read the original document P.

The scanner 1A can be connected to an external computer 60, and information is input from the external computer 60 to the control unit 40. The external computer 60 includes a display unit 62. A user interface (UI) is realized on the display unit 62 by the control program stored in a storage section, which is not illustrated in the drawing, in the external computer 60.

Concerning Change in Feeding Conditions

Figure 5:
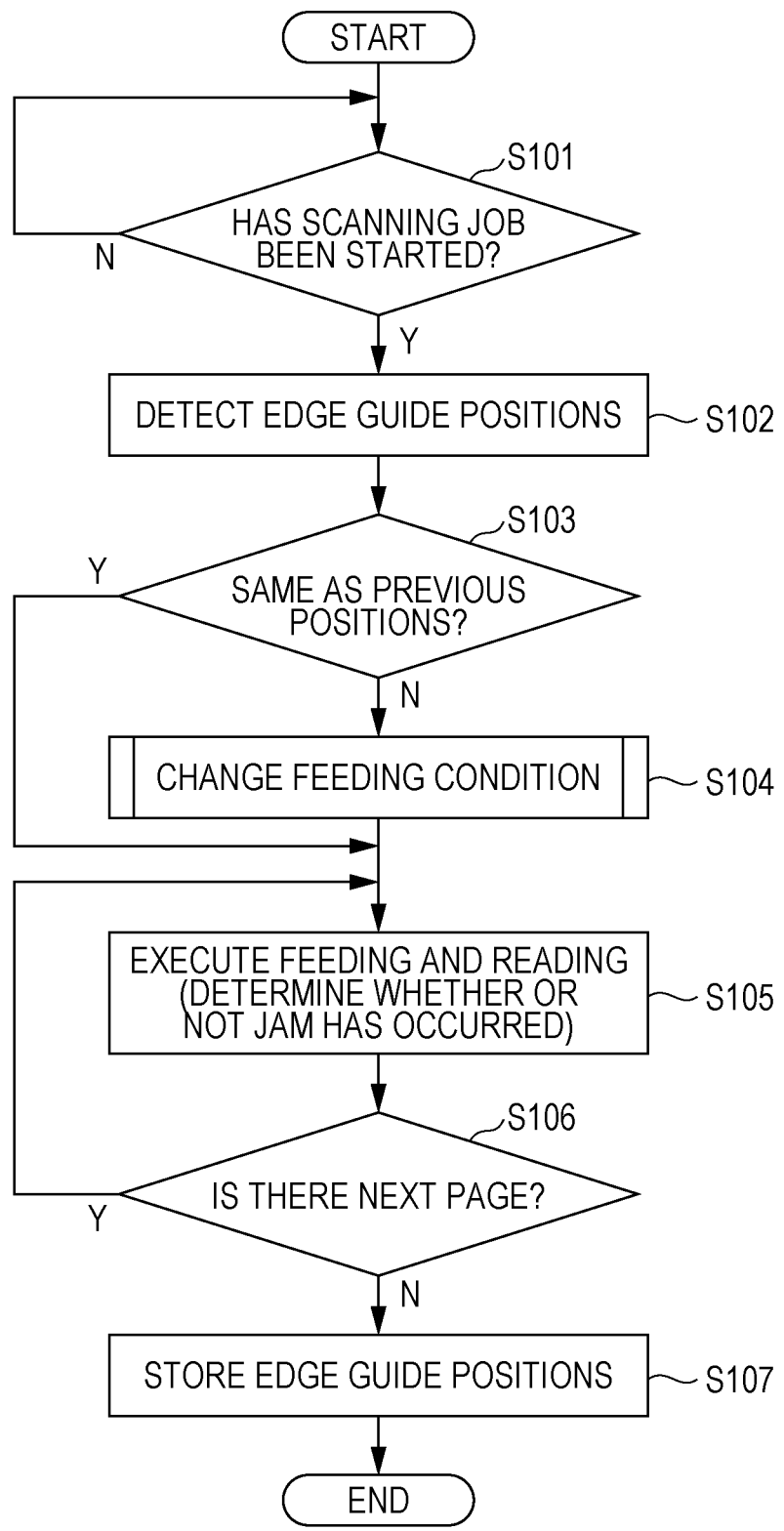
FIG. 5 is a flowchart illustrating an overall flow for controlling reading of an original document.

Next, optimization of jam determination performed by the control unit 40 (FIG. 4) will be described with reference to FIG. 5 and the following drawings. First, a flow of overall control of reading of an original document will be described with reference to FIG. 5. FIG. 5 is a flowchart illustrating an overall flow of the control of reading of an original document.

A main point of the invention is that the control unit 40 changes the feeding conditions in accordance with the positions of the edge guides 12.

In FIG. 5, if a scanning job is started from a stand-by state (Yes in Step S101), the control unit 40 detects positions of the edge guides 12 (Step S102), determines whether or not the positions of both the first edge guide 12A and the second edge guide 12B are the same as those at the time of previous detection (Step S103), and if the positions are the same (Yes in Step S103), the control unit 40 performs a series of reading control operations in Step S105 and the following steps.

If the position of any one of the first edge guide 12A and the second edge guide 12B is different from that at the time of the previous detection (No in Step S103), the control unit 40 changes the feeding conditions (Step S104) and executes feeding and reading of the original document P on the basis of the changed feeding conditions (Step S105).

The control unit 40 performs jam determination at the time of executing feeding and reading of the original document P. In a case in which there is a next page (Yes in Step S106), then the control unit 40 executes Step S105 again. In a case in which there is not a next page (No in Step S106), then the positions of the edge guides 12 detected this time are saved in the memory 43 (FIG. 3) that is an example of the storage unit (Step S107). The placement detection unit 35 (FIG. 2) can detect whether or not there is a next page.

Next, specific content of a change in the feeding conditions will be described. In the embodiment, the control unit 40 changes the feeding conditions, more specifically, at least one of the threshold value for performing jam determination, the original document feeding speed, and the original document transport speed in accordance with the positions of the edge guides 12. Note that the original document feeding speed described here is an original document sending speed of the feeding rollers 14 (FIG. 2) while the original document transport speed is an original document sending speed of the transport roller pair 16 (FIG. 2) and the discharge roller pair 17 (FIG. 2).

It is a matter of course that although there is also a case in which the feeding conditions are not changed as a result depending on the positions of the edge guides 12 even if the positions of the edge guides 12 have changed from the previous detection value, the control unit 40 attempts to change the feeding conditions in a case in which the positions of the edge guides 12 have changed from the previous detection value in any case.

Figure 6:
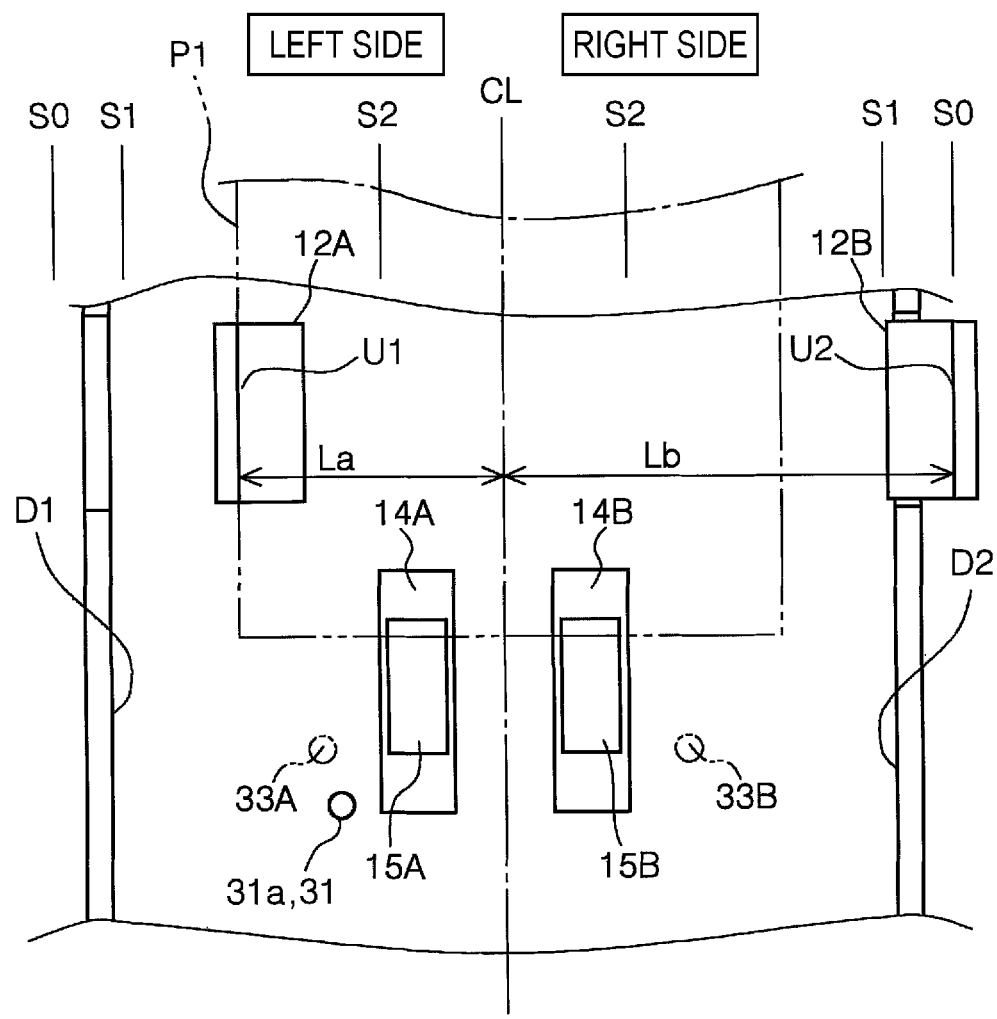
FIG. 6 is a plan view illustrating the original document feeding path in the scanner according to the invention.

Note that illustration of the edge guide position detection unit 34 illustrated in FIG. 3 is omitted in FIG. 6 and the following drawings in order to avoid complication of the drawings, and illustration of the original document feeding path T and the downstream path Q on the downstream of the feeding rollers 14 is also omitted.

FIG. 6 illustrates a state in which the second edge guide 12B is located further outward than the maximum guide position S1 (specifically, the extended position S0) and the first edge guide 12A is located further inward than the maximum guide position S1 (that is La<Lb).

The reference numeral P1 in FIG. 6 represents an original document, and FIG. 6 illustrates a state in which only the first edge guide 12A is a position at which the first edge guide 12A appropriately guides the edge of the original document P1, in other words, a state in which the pair of edge guides 12 is not positions that are symmetric with respect to the center position CL.

In addition, it is possible to state that the feeding rollers 14A and 14B are not located at the center of the pair of edge guides 12. Note that the two feeding rollers 14A and 14B are provided in the embodiment, and the two feeding rollers 14A and 14B are provided at positions that are symmetric with respect to the center position CL. Therefore, the arrangement that "the feeding rollers 14A and 14B are located at the center of the pair of edge guides 12" can also be expressed as arrangement that "an intermediate position, that is, the center position CL of the feeding rollers 14A and 14B is located at the center between the first edge guide 12A and the second edge guide 12B" in a strict sense.

It is possible to state that skewing and jam of the original document P1 tend to occur if the second edge guide 12B is not located at the appropriate position at which the second edge guide 12B is to guide the edge of the original document P1 in this manner. Since this is also a state in which the feeding rollers 14A and 14B are not located at the center of the pair of edge guides 12, it is also possible to state that this is a state in which skewing and jam of the original document P1 tend to occur in this regard.

In such a case, the control unit 40 sets the threshold value for performing jam determination to be smaller than the threshold value that is applied in a case in which the pair of edge guides 12 is at positions at which the edge guides 12 appropriately guide the edges of the original document P1, that is, in a case in which the pair of edge guides 12 is located at positions that are symmetric with respect to the center position CL (increases jam detection sensitivity).

From another viewpoint, the control unit 40 sets the threshold value for performing jam determination to be smaller than the threshold value that is applied in a case in which the feeding rollers 14A and 14B are located at the center of the pair of edge guides 12 (increases jam detection sensitivity).

In this manner, since the control unit 40 changes the threshold value in accordance with the positions of the edge guides 12, it is possible to obtain a device configuration achieve in consideration of both usability of the device and more appropriate jam determination.

Note that although FIG. 6 illustrates, as an example, a state in which the second edge guide 12B is at the extended position S0 further outward than the maximum guide position S1 while the first edge guide 12A is positioned further inward than the maximum guide position S1 (that is, La<Lb), the same is true for the opposite case, that is, it is possible to more appropriately perform jam determination by similarly reducing the threshold value (increasing jam detection sensitivity) even in a state in which the first edge guide 12A is located at the extended position S0 further outward than the maximum guide position S1 while the second edge guide 12B is located further inward than the maximum guide position S1.

Figure 7:
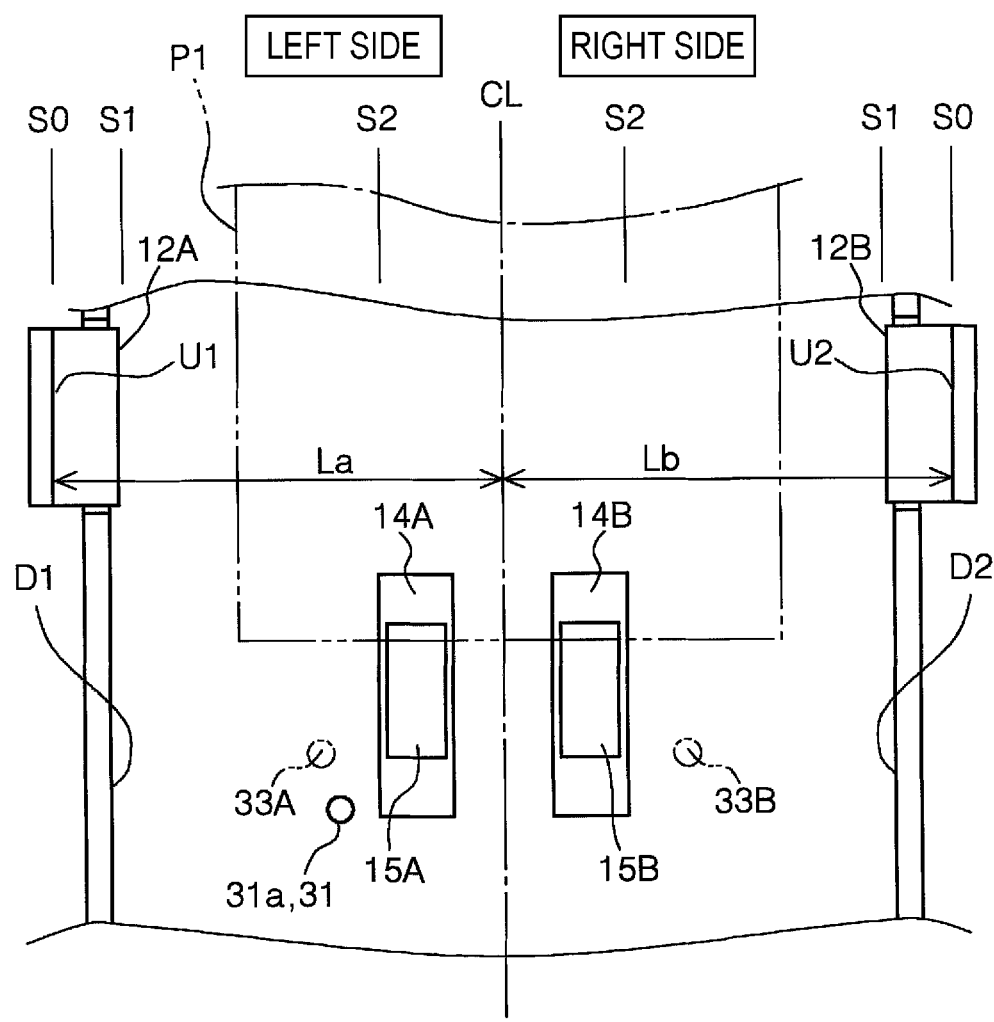
FIG. 7 is a plan view illustrating the original document feeding path in the scanner according to the invention.

In FIG. 7, both the edge guides 12 in the pair are at the extended position S0. This case means that the original document P1 is fed with the edges on both sides not guided regardless of the size of the original document P1. That is, when both the edge guides 12 in the pair are located at the extended position S0 even if the edge guides 12 are at positions that are symmetric with respect to the center position CL (that is, La=Lb), the control unit 40 sets the threshold value for performing jam determination to be smaller than that in a case in which the pair of edge guides 12 is located at the maximum guide position S1 or further inward than the maximum guide position S1 (increases jam detection sensitivity). In this manner, it is possible to more appropriately perform jam determination.

Although the threshold value for performing jam determination is targeted as a feeding condition to be changed in the embodiment described above, a feeding speed, for example, may be changed instead of or in addition to the threshold value.

In a case in which the pair of edge guides 12 is not located at positions that are symmetric with respect to the center position CL as illustrated in FIG. 6, for example, or from another viewpoint, in a case in which the feeding rollers 14A and 14B are not located at the center of the pair of edge guides 12, the control unit 40 sets the feeding speed to be lower than the feeding speed in a case in which the pair of edge guides 12 is located at the positions that are symmetric with respect to the center position CL, or from another viewpoint, in a case in which the feeding rollers 14A and 14B are located at the center of the pair of edge guides 12. In this manner, it is possible to expect an effect of suppressing jam of the original document P1.

Since skewing similarly tends to occur in a case in which the pair of edge guides 12 in the pair are located at the extended position S0 as illustrated in FIG. 7, it is preferable to reduce the feeding speed.

Note that although the feeding speed described here means the original document feeding speed of the feeding rollers 14A and 14B, the original document transport speed of the transport roller pair 16 and the discharge roller pair 17 on the further downstream side may also be changed similarly to the original document feeding speed.

Figure 8:
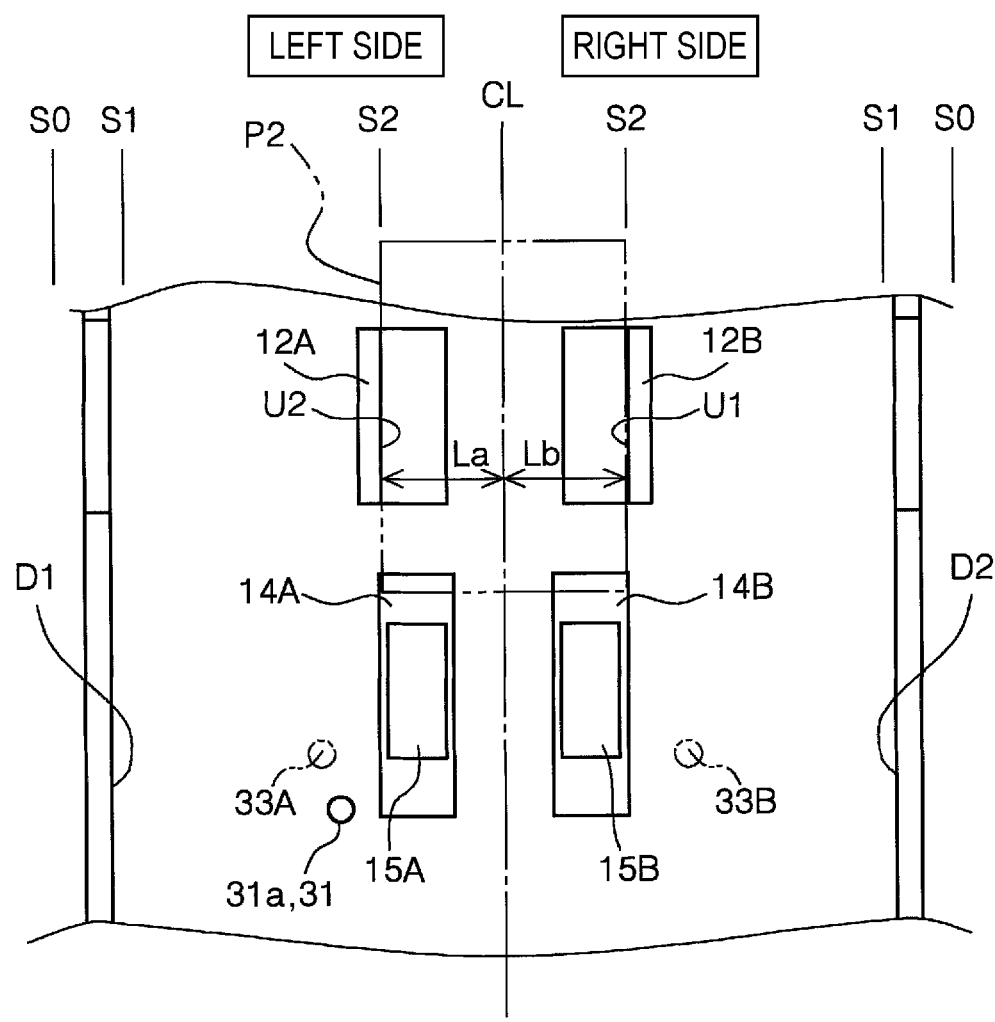
FIG. 8 is a plan view illustrating the original document feeding path in the scanner according to the invention.

FIG. 8 illustrates a state in which the pair of edge guides 12 is located at the guide position S2 that is a card compatible position corresponding to the shorter side of the card size defined by ISO/IEC 7810 ID-1. The reference numeral P2 represents a card size original document.

The control unit 40 sets the threshold value for performing jam determination in this case to be larger than the threshold value that is applied in a case in which the pair of edge guides 12 is located at the position corresponding to the original document that is larger than the card size (reduces detection sensitivity). Alternatively, jam determination may not be performed.

That is, in a case in which the original document P2 has a card size, there is a high probability that the original document P2 is formed of plastic. In a case of such a thick card formed of plastic, relatively large sound tends to occur at the time of feeding, and there is a concern that it is erroneously determined that jam has occurred even if no jam has occurred. Thus, it is possible to suppress or avoid the concern of erroneous determination as described above by increasing the threshold value (reducing detection sensitivity) or not performing jam determination.

Note that although FIG. 8 illustrates an example in which the pair of edge guides 12 is located at positions at which the longer side of the card size original document P2 is guided, similar control may be performed in a case in which the pair of edge guides 12 is located at positions at which the shorter side of the card size original document P2 is guided.

Figure 9:
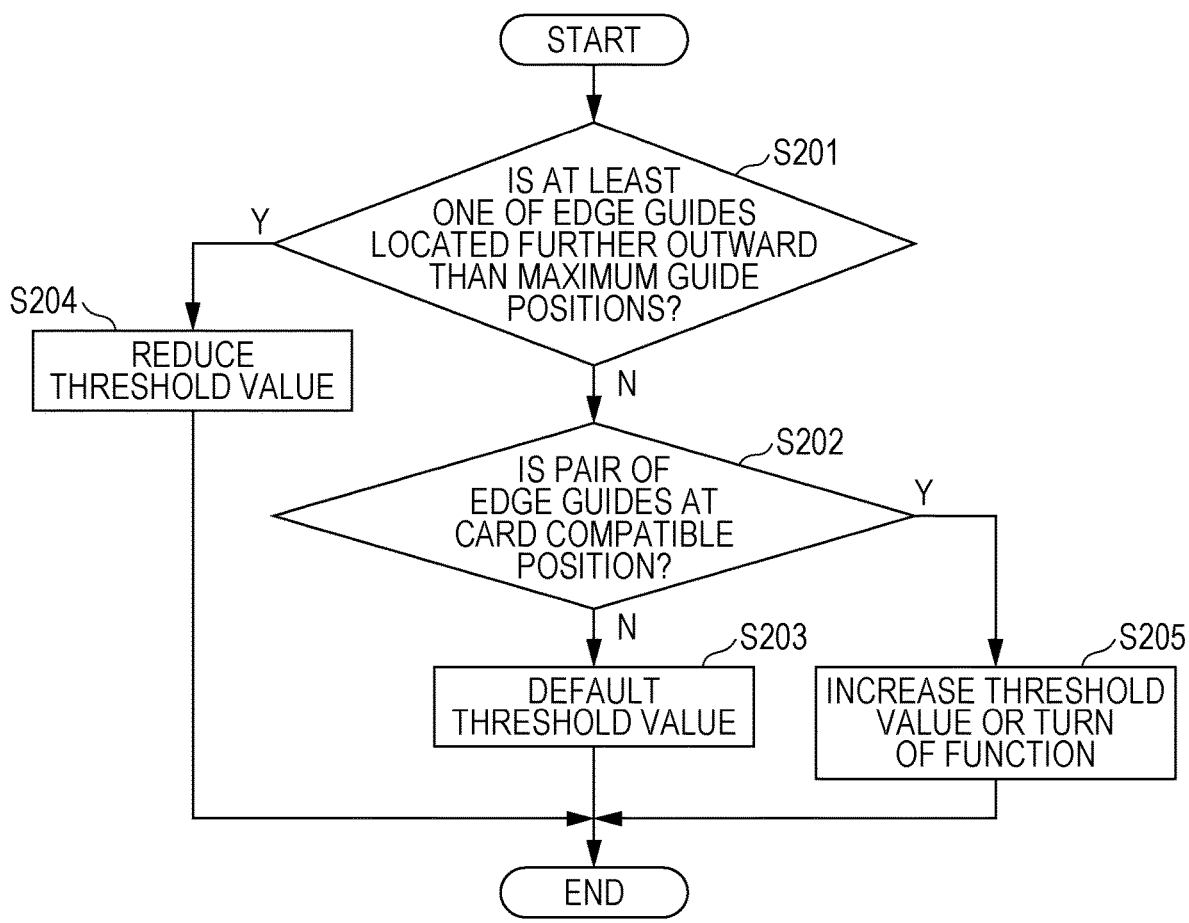
FIG. 9 is a flowchart illustrating a flow for changing feeding control.

The aforementioned method of changing the feeding conditions is summarized as illustrated in FIG. 9. The control unit 40 determines whether or not at least one of the pair of edge guides 12 is located further outward than the maximum guide position S1 (Step S201), and if at least one is located further outward than the maximum guide position S1 (Yes in Step S201), the control unit 40 reduces the threshold value for performing jam determination, that is, increases jam detection sensitivity (Step S204). In a case in which both the edge guides 12 in the pair are located at the maximum guide position S1 or further inward than the maximum guide position S1 (No in Step S201), it is determined whether or not the pair of edge guides 12 is located at the guide position S2 that is a card compatible position (Step S202). If the pair of edge guides 12 is located at the guide position S2 that is the card compatible position (Yes in Step S202), the threshold value is increased (detection sensitivity is reduced) or a jam determination function is turned off (Step S205). In a case in which answers in both Steps S201 and S202 are NO, a default threshold value is applied (Step S203).

Note that various ways to increase or reduce the threshold value can be considered, a value may be set in advance, or the default threshold value may be multiplied by a coefficient (1.2, for example) that is greater than 1 to increase the threshold value, and the default threshold value may be multiplied by a coefficient (0.8, for example) that is smaller than 1 to reduce the threshold value.

Next, another embodiment will be described with reference to FIG. 10. The control unit 40 performs jam determination on the basis of a first detection value obtained from a first sound detection unit 33A and a first threshold value that is a threshold value corresponding to the first detection value, and in addition, performs jam determination on the basis of a second detection value obtained from a second sound detection unit and a second threshold value that is a threshold value corresponding to the second detection value. That is, if jam has determined to have occurred from any of the values, the control unit 40 determines that jam has occurred as a result and performs necessary processing such as stopping of feeding and issuing of an alert.

Figure 10:
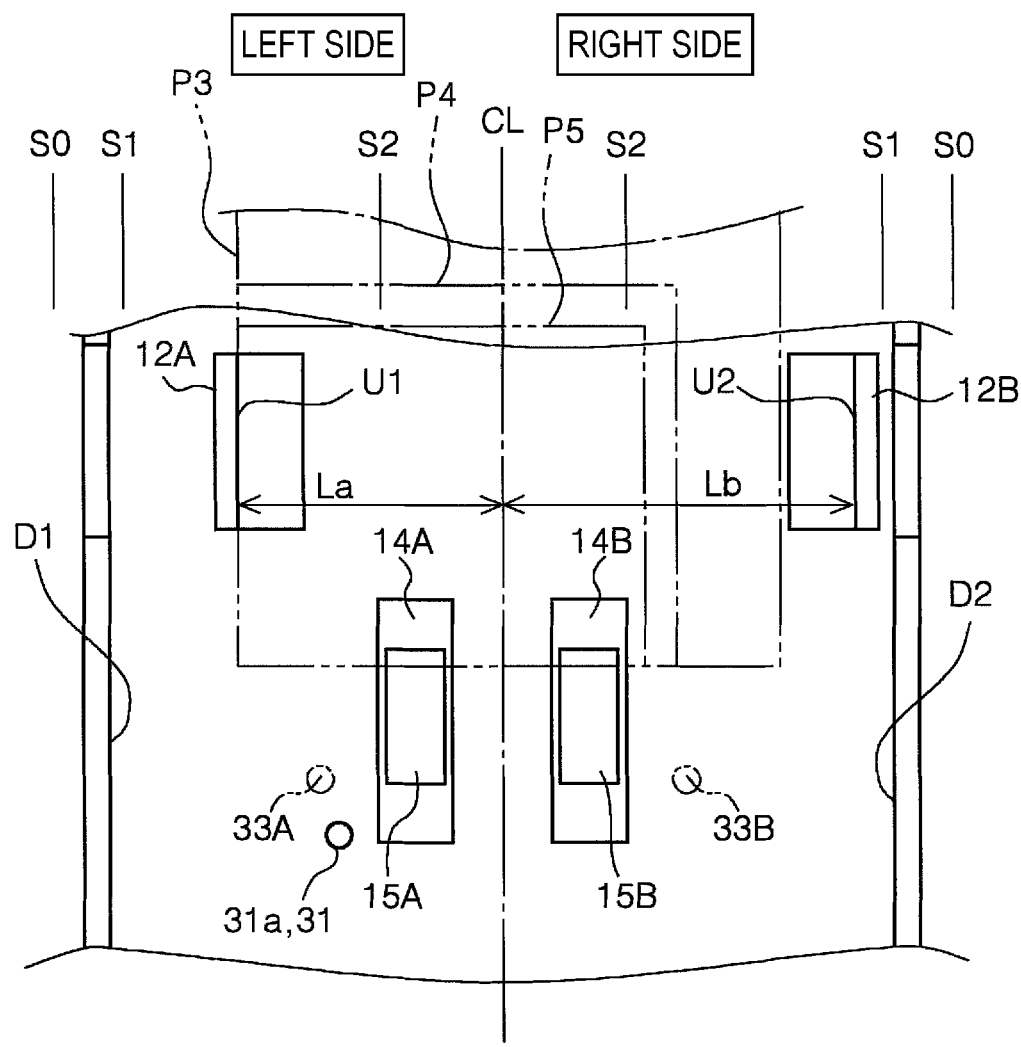
FIG. 10 is a plan view illustrating the original document feeding path in the scanner according to the invention.

Here, in a case in which the first edge guide 12A is closer to the center position CL than the second edge guide 12B as illustrated in FIG. 10, the control unit 40 may set the first threshold value for jam determination using the first sound detection unit 33A on the side closer to the first edge guide 12A to be smaller than the second threshold value for jam determination using the second sound detection unit 33B on the side closer to the second edge guide 12B, on the basis of a detection signal of the edge guide position detection unit 34 (FIGS. 3 and 4). Reducing the threshold value is namely increasing detection sensitivity, that is, increasing detection sensitivity for jam determination using the first sound detection unit 33A to be higher than detection sensitivity for jam determination using the second sound detection unit 33B.

Hereinafter, further details will be described. In a case in which the pair of edge guides 12 is located asymmetrically with respect to the center position CL as illustrated in FIG. 10, the user tends to set the original document such that an edge thereof conforms to the first edge guide 12A on the side closer to the center position CL. In addition, the user tends to position the edge guides 12 asymmetrically with respect to the center position CL and set original documents such that edges thereof conform to the first edge guide 12A on the side closer to the center position CL when the user sets the original documents with different sizes. Original documents P3, P4, and P5 are original documents with different sizes in FIG. 10, and there are such cases in which original document with different sizes are placed together.

In this case, if skewing of the original document occurs, the edge of the original document strongly collides against the edge guide that is closer to the center position CL (the first edge guide 12A in the example of FIG. 10), and large sound occurs on the side of the first edge guide 12A. If this is reliably detected, it is possible to prevent jam due to the skewing of the original document or to suppress advancement of jam.

Thus, in a case in which the first edge guide 12A is closer to the center position CL than the second edge guide 12B as illustrated in FIG. 10, the control unit 40 sets the first threshold value for jam determination using the first sound detection unit 33A on the side closer to the first edge guide 12A to be smaller than the second threshold value for jam determination using the second sound detection unit 33B on the side closer to the second edge guide 12B (increases detection sensitivity) on the basis of a detection signal of the edge guide position detection unit 34 (FIGS. 3 and 4).

Figure 11:
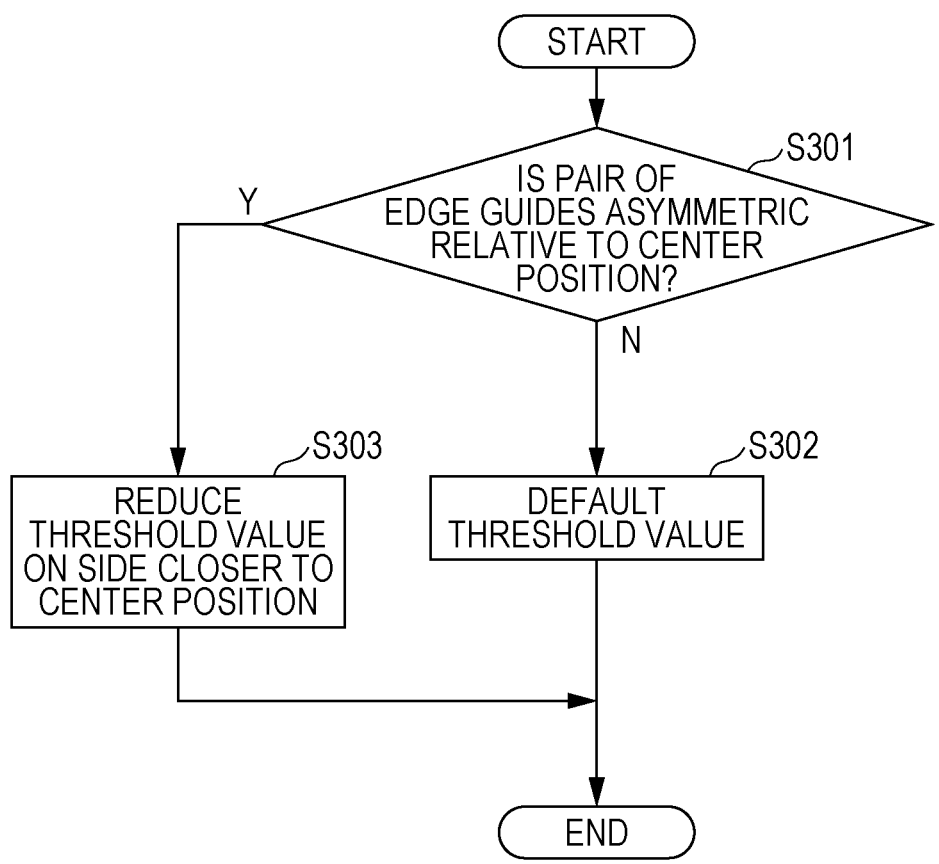
FIG. 11 is a flowchart illustrating a flow for changing feeding control.

FIG. 11 illustrates a flow of this control, control unit 40 determines whether or not the pair of edge guides 12 is asymmetric with respect to the center position CL (Step S301), and if the edge guides 12 are asymmetric (Yes in Step S301), the control unit 40 reduces the threshold value for jam determination using the sound detection unit corresponding to the edge guide on the side closer to the center position CL, that is, increases jam detection sensitivity (Step S303). In a case in which the pair of edge guides 12 is not asymmetric with respect to the center position CL, that is, in a case in which the pair of edge guides 12 is at symmetric positions (No in Step S301), the default threshold value is used (Step S302).

It is possible to more reliably and quickly detect that the edge of the original document has strongly collided against the first edge guide 12A as described above, thus to prevent jam caused by skewing of the original document, or to suppress advancement of jam.

The control unit 40 has an ordinary mode in which the control unit 40 ends a feeding job in a case in which feeding of the last original document on the original document placement unit 11 has been detected on the basis of a detection signal of the placement detection unit 35 (FIGS. 2 and 4), that is, in a case in which a state in which some original document is present has been changed to a state in which no original document is present and a stand-by feeding mode in which the feeding job is once stopped and is waited until the next original document is placed on the original document placement unit 11 and the feeding job is restarted if the next original document is placed on the original document placement unit 11. The control unit 40 sets the threshold value that is applied when the stand-by feeding mode is executed to be lower than the threshold value that is applied when the ordinary mode is executed, that is, increases jam detection sensitivity.

That is, feeding is performed without using the pair of edge guides 12 with original documents with different sizes set or with a pair of edge guides 12 located at the most extended position (extended position S0) in the stand-by feeding mode in many cases. That is, conditions under which skewing tends to happen occur.

Thus, the control unit 40 can more appropriately perform jam determination by setting the threshold value that is applied when the stand-by feeding mode is executed to be smaller than the threshold value that is applied when the ordinary mode is executed, that is, by increasing jam detection sensitivity.

Note that the pair of edge guides 12 may be at any positions when the threshold value that is applied when the stand-by feeding mode is executed is set to be smaller than the threshold value that is applied when the ordinary mode is executed. This is because there is a high probability that original documents with a variety of sizes are placed together regardless of the positions of the pair of edge guides 12 in the stand-by feeding mode, and as a result, there is a high probability that the edges of the original documents are not appropriately guided.

Note that the control unit 40 may issue an alert in a case in which the positions of the pair of edge guides 12 are different from the positions of the pair of edge guides 12 at the time of previously executing feeding. In this manner, it is possible to expect prevention of jam by prompting the user to appropriately use the pair of edge guides 12, for example.

Note that although the threshold value for determining jam is changed on the basis of a sound volume (detection value) in the original document feeding path T detected by the sound detection unit 33 in accordance with the positions of the pair of edge guides 12 in the aforementioned embodiment, it is needless to say that the invention is not limited thereto and can be applied to determine whether or not a certain event has occurred by evaluating a certain detection value on the basis of a certain threshold value.

For example, the invention can be used when a drive current value of the feeding roller motor 45 (FIG. 4) or the transport roller motor 46 (FIG. 4) is regarded as a detection value, and it is determined that jam has occurred in a case in which the detection value has exceeded a threshold value.

Although the case in which the medium feeding device according to the invention is applied to the scanner that is an example of the image reading apparatus has been described above in the aforementioned embodiment, it is also possible to apply the medium feeding device to a recording device provided with a recording head that performs recording on a medium, representative examples of which include a printer.

The entire disclosure of Japanese Patent Application No. 2018-027901, filed Feb. 20, 2018 is expressly incorporated by reference herein.

What is claimed is:

1. A medium feeding device comprising:
   a placement unit on which a medium is placed;
   a pair of edge guides that is provided at the placement unit such that the edge guides are movable in a medium width direction to guide edges of the medium in the medium width direction that is a direction intersecting a medium feeding direction;
   feeding rollers that feed the medium placed on the placement unit;
   a medium feeding path through which the medium fed from the placement unit passes;
   a path state detection section that detects a detection value in accordance with a state of the medium feeding path;
   a guide position detection section that detects positions of the edge guides, wherein the guide position detection section is attached to at least one of the pair of edge guides; and
   a control section that determines whether or not the detection value detected by the path state detection section has exceeded a threshold value,
   wherein the control section changes the threshold value in accordance with a detection signal of the guide position detection section,
   wherein the control section is able to detect relative positions of the pair of edge guides and the feeding rollers in the medium width direction on the basis of the detection signal of the guide position detection section, and wherein the control section sets the threshold value that is applied in a case in which the feeding rollers are not located at the center of the pair of edge guides in the medium width direction to be smaller than the threshold value applied in a case in which the feeding rollers are located at the center of the pair of edge guides on the basis of the detection signal of the guide position detection section.

2. The medium feeding device according to claim 1, wherein the pair of edge guides is able to be displaced from maximum guide positions when both edges of a medium with the largest size in the medium width direction from among media with feedable sizes are guided to extended positions that are positions at which an interval between the edge guides are further extended, and wherein the control section sets the threshold value that is applied in a case in which the pair of edge guides is on the further extended position side than the maximum guide positions to be smaller than the threshold value that is applied in a case in which the pair of edge guides is located at the maximum guide positions or further inward than the maximum guide positions on the basis of the detection signal of the guide position detection section.

3. The medium feeding device according to claim 2, wherein the control section sets a medium feeding speed of the feeding rollers in a case in which the pair of edge guides is located on a further extended position side than the maximum guide positions to be lower than a medium feeding speed of the feeding rollers in a case in which the pair of edge guides is located at the maximum guide positions or further inward than the maximum guide positions on the basis of the detection signal of the guide position detection section.

4. The medium feeding device according to claim 2, wherein the maximum guide positions are positions at which longer sides of an A4 size paper defined by ISO 216 or longer sides of a letter size paper defined by ANSI A are guided.

5. An image reading apparatus comprising:
a reading section that reads a medium; and
the medium feeding device according to claim 2 that transports the medium to the reading section.

6. An image reading apparatus comprising:
a reading section that reads a medium; and
the medium feeding device according to claim 3 that transports the medium to the reading section.

7. An image reading apparatus comprising:
a reading section that reads a medium; and
the medium feeding device according to claim 4 that transports the medium to the reading section.

8. The medium feeding device according to claim 1, wherein the control section issues an alert in a case in which current positions of the edge guides are different from positions of the edge guides at the time of previously executing feeding.

9. An image reading apparatus comprising:
a reading section that reads a medium; and
the medium feeding device according to claim 8 that transports the medium to the reading section.

10. The medium feeding device according to claim 1, wherein the path state detection section is a section that detects a change in sound in the medium feeding path, and the detection value is a value indicating a sound volume, and wherein the control section determines that jam has occurred as the abnormality in a case in which the detection value has exceeded the threshold value.

11. An image reading apparatus comprising:
a reading section that reads a medium; and
the medium feeding device according to claim 10 that transports the medium to the reading section.

12. An image reading apparatus comprising:
a reading section that reads a medium; and
the medium feeding device according to claim 1 that transports the medium to the reading section.

13. A medium feeding device comprising:
a placement unit on which a medium is placed;
a pair of edge guides that is provided at the placement unit such that the edge guides are movable in a medium width direction to guide edges of the medium in the medium width direction that is a direction intersecting a medium feeding direction;
feeding rollers that feed the medium placed on the placement unit;
a medium feeding path through which the medium fed from the placement unit passes;
a path state detection section that detects a detection value in accordance with a state of the medium feeding path;
a guide position detection section that detects positions of the edge guides, wherein the guide position detection section is attached to at least one of the pair of edge guides; and
a control section that determines whether or not the detection value detected by the path state detection section has exceeded a threshold value,
wherein the control section changes the threshold value in accordance with a detection signal of the guide position detection section,
wherein the pair of edge guides is able to be displaced to card compatible positions at which shorter sides or longer sides of a medium with a card size defined by ISO/IEC 7810 ID-1 are guided, and
wherein the control section sets the threshold value that is applied in a case in which the pair of edge guides is located at the card compatible positions to be larger than the threshold value that is applied in a case in which the pair of edge guides is located further outward than the card compatible positions or does not determine whether or not abnormality has occurred, on the basis of the detection signal of the guide position detection section.

14. An image reading apparatus comprising:
a reading section that reads a medium; and
the medium feeding device according to claim 13 that transports the medium to the reading section.

15. A medium feeding device comprising:
a placement unit on which a medium is placed;
a first edge guide and a second edge guide that are provided at the placement unit such that the first edge guide and the second edge guide are movable in a medium width direction to guide edges of the medium in the medium width direction that is a direction intersecting a medium feeding direction;
feeding rollers that feed the medium placed on the placement unit;
a medium feeding path through which the medium fed from the placement unit passes;

a guide position detection section that detects positions of the edge guides;

a first path state detection section that detects a detection value in accordance with a state of the medium feeding path and is provided on a side of the first edge guide in the medium width direction;

a second path state detection section that detects a detection value in accordance with a state of the medium feeding path and is provided on a side of the second edge guide in the medium width direction; and a control section that determines whether or not the detection value detected by the path state detection section has exceeded a threshold value, wherein the control section determines whether or not abnormality has occurred on the basis of a first detection value detected by the first path state detection section and a first threshold value that is the threshold value corresponding to the first detection value and determines whether or not abnormality has occurred on the basis of a second detection value detected by the second path state detection section and a second threshold value that is the threshold value corresponding to the second detection value, and wherein the control section sets the first threshold value to be smaller than the second threshold value in a case in which the first edge guide is closer to the center position of the medium feeding path in the medium width direction than the second edge guide on the basis of a detection signal of the guide position detection section.

16. An image reading apparatus comprising:
a reading section that reads a medium; and
the medium feeding device according to claim 15 that transports the medium to the reading section.

17. A medium feeding device comprising:
a placement unit on which a medium is placed;
a pair of edge guides that is provided at the placement unit such that the edge guides are movable in a medium width direction to guide edges of the medium in the medium width direction that is a direction intersecting a medium feeding direction;

feeding rollers that feed the medium placed on the placement unit;

a medium feeding path through which the medium fed from the placement unit passes;

a path state detection section that detects a detection value in accordance with a state of the medium feeding path;

a guide position detection section that detects positions of the edge guides; and a control section that determines whether or not the detection value detected by the path state detection section has exceeded a threshold value, wherein the control section is able to detect relative positions of the pair of edge guides and the feeding rollers in the medium width direction on the basis of a detection signal of the guide position detection section, and wherein the control section sets the threshold value that is applied in a case in which the feeding rollers are not located at the center of the pair of edge guides in the medium width direction to be smaller than the threshold value applied in a case in which the feeding rollers are located at the center of the pair of edge guides on the basis of the detection signal of the guide position detection section.

18. An image reading apparatus comprising:
a reading section that reads a medium; and
the medium feeding device according to claim 17 that transports the medium to the reading section.

\* \* \* \* \*